(12) United States Patent
Zansky et al.

(10) Patent No.: US 8,400,745 B1
(45) Date of Patent: Mar. 19, 2013

(54) FUSE APPARATUS

(75) Inventors: Zoltan Zansky, Sunnyvale, CA (US); Roshan Thakur, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 567 days.

(21) Appl. No.: 12/112,865

(22) Filed: Apr. 30, 2008

(51) Int. Cl.
*H02H 3/08* (2006.01)
*H02H 9/02* (2006.01)

(52) U.S. Cl. .................................. 361/103

(58) Field of Classification Search ........... 361/79, 361/56, 87, 93.1, 93.9
See application file for complete search history.

(56) References Cited

U.S. PATENT DOCUMENTS

| | | | |
|---|---|---|---|
| 3,725,578 A * | 4/1973 | Brown et al. | 348/725 |
| 3,745,544 A * | 7/1973 | Ono | 340/870.22 |
| 3,978,993 A * | 9/1976 | Howard | 414/22.55 |
| 4,021,828 A * | 5/1977 | Iura et al. | 396/285 |
| 4,025,863 A * | 5/1977 | Higuchi et al. | 363/25 |
| 4,317,071 A * | 2/1982 | Murad | 315/312 |
| 4,330,816 A * | 5/1982 | Imazeki et al. | 363/21.05 |
| 4,593,370 A * | 6/1986 | Balkanli | 702/98 |
| 4,661,879 A * | 4/1987 | Sato et al. | 361/58 |
| 4,665,318 A * | 5/1987 | Toda et al. | 250/570 |
| 4,815,126 A * | 3/1989 | Goode et al. | 379/359 |
| 5,043,825 A * | 8/1991 | Heitmann et al. | 386/351 |
| 5,384,516 A * | 1/1995 | Kawabata et al. | 315/160 |
| 5,406,471 A * | 4/1995 | Yamanaka | 363/124 |
| 5,510,974 A * | 4/1996 | Gu et al. | 363/134 |
| 5,793,623 A * | 8/1998 | Kawashima et al. | 363/56.05 |
| 5,969,758 A * | 10/1999 | Sauer et al. | 348/241 |
| 5,978,261 A * | 11/1999 | Tailliet | 365/185.01 |
| 5,991,199 A * | 11/1999 | Brigati et al. | 365/185.12 |
| 6,738,245 B2 * | 5/2004 | Ely | 361/91.1 |
| 7,239,187 B2 * | 7/2007 | Ishikawa | 327/143 |
| 2006/0132997 A1 * | 6/2006 | Chu et al. | 361/79 |

* cited by examiner

*Primary Examiner* — Rexford Barnie
*Assistant Examiner* — Zeev V Kitov
(74) *Attorney, Agent, or Firm* — Klein, O'Neill & Singh, LLP

(57) ABSTRACT

A fuse apparatus for protecting a device and a load coupled to the device may include a switch. The switch may be configured to interrupt current to protect a device and a load coupled to the device. A fuse apparatus may include a current sensor which may be coupled to a controller. The controller may control the switch to interrupt current to protect a device when current exceeds a threshold current. Additionally, a fuse apparatus may include a voltage sensor coupled to the controller. The controller may control the switch to interrupt current to protect a load when an output voltage of the device exceeds a threshold voltage.

12 Claims, 4 Drawing Sheets

FUSE APPARATUS

TECHNICAL FIELD

The present disclosure generally relates to the field of power regulation, and more particularly to a fuse apparatus.

BACKGROUND

Many common devices, including processors and electronic circuits, require a stable, steady direct current (DC) voltage for efficient operation. Power may be supplied in the form of Alternating Current (AC) by a central utility via power lines or from a physical plant that is part of a facility. Thus, it is often desirable to convert AC power to DC power.

In many types of multiple component devices, different components may require different voltages to operate efficiently. For example, an information handling system may include a fan which may require 12 volts while a processor may require 1.1 volts. A device which requires multiple voltages may include an AC/DC converter which supplies 12 volts (DC) and a DC/DC converter which converts a 12 volt input to a 1.1 volt output, suitable for a processor of an information handling system.

In order to protect the converters against an internal short circuit, which may result in an emergency condition such as a fire, safety devices may be included. For example, a fuse or fuse link may be installed within converters to protect the converter against a short circuit. A fuse link might refer to a type of fuse that will melt and open a protected circuit in the event of a large current flow caused by a short circuit. A drawback associated with a conventional fuses and fuse links is the delay associated with fuse operation which may cause a high voltage to be supplied to a load coupled to a device, such as a converter. For example, a processor may be damaged if it receives a voltage higher than a maximum allowable voltage.

SUMMARY

Accordingly, the present disclosure is directed to a fuse apparatus. In one embodiment, a fuse apparatus may include a switch configured to interrupt current to protect a device and a load coupled to the device. A fuse apparatus may include a current sensor which may be coupled to a controller. The controller may control the switch to interrupt current to protect a device when current exceeds a threshold current. Additionally, a fuse apparatus may include a voltage sensor coupled to the controller. The controller may control the switch to interrupt current to protect a load when an output voltage of the device exceeds a threshold voltage.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring to FIGS. 1-4, embodiments of a method and apparatus for protecting a device and a load coupled to a device are shown. A fuse apparatus may be employed within a device, such as a converter, to protect the device against a large current or large voltage condition. It is contemplated that a fuse apparatus may be employed in many types of multiple component devices, such as information handling systems and data storage systems, to protect the devices themselves and the loads which may be coupled to the devices.

Figure 1:
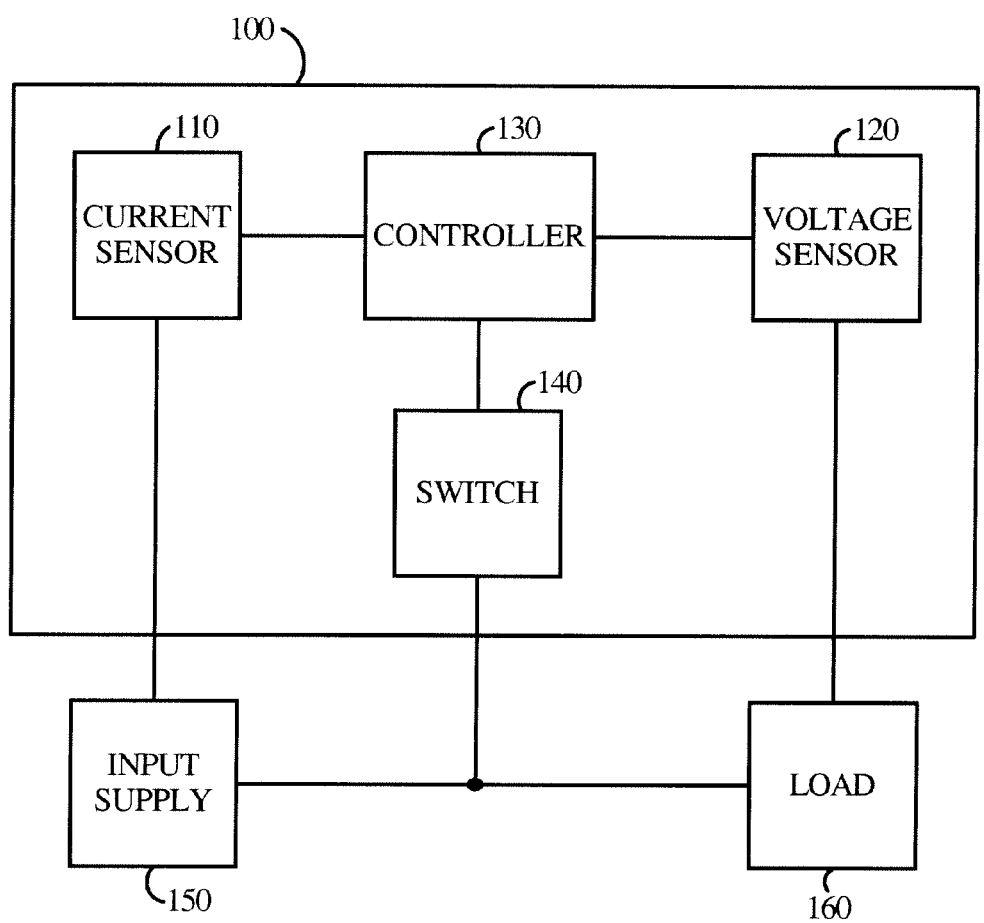
FIG. 1 is a block diagram of a fuse apparatus.

Referring to FIG. 1, a block diagram of a fuse apparatus 100 is shown. Fuse apparatus 100 may interrupt current to protect a device and a load coupled to the device. In an embodiment, a fuse apparatus 100 may be employed with a device. It is contemplated that a device may include any type of power supply and power converter, including buck converters, boost converters, and other types of DC/DC topologies. It is contemplated that a converter may include any device that receives an input voltage and provides a lower voltage (e.g. buck converter) or provides a higher voltage (e.g. a boost converter). Additionally, fuse apparatus may be employed within voltage regulator modules. In many applications, a load may be coupled to an output of a device, such as power converter. A load, such as a processor, may require a precise voltage in order to operate efficiently.

Fuse apparatus 100 may be employed with a voltage regulator module (VRM) application. Fuse apparatus 100 may detect a high current condition, such as an internal short circuit within the VRM and interrupt current to protect the voltage regulator module and prevent an emergency condition, such as a fire. Interruption of current may include redirection of current and the creation of an open circuit condition. Additionally, fuse apparatus 100 may detect a high voltage supplied at the output of the VRM to the load and interrupt current flow to protect the load, such as a processor. This may prevent damage to the processor and allow continued operation of the processor.

Fuse apparatus 100 may be employed in power supplies and converters supplying power for information handling systems, such as a computing system of a data storage system and/or storage rack, shelf and the like. Data storage systems include expensive processors which may be damaged by a large current or large voltage supplied to the processor. Fuse apparatus 100 may protect processors and other components of a data storage system by preventing a large current or large voltage being supplied to the processor and other components. Also, fuse apparatus 100 may protect the power supply and converter of the data storage system. In the instance of a short circuit within the power supply or converter, fuse apparatus 100 may quickly respond and prevent a fire within the data storage system. Consequently, fuse apparatus 100 may ensure valid read and write access to data on a continuous basis for the data storage system. This may increase reliability of the data storage system and ensure consistent operation.

Fuse apparatus 100 may include a current sensor 110, a voltage sensor 120, a controller 130 and a switch 140. A current sensor 110 may be coupled to an input supply 150. Input supply 150 may be an input voltage supplied to a device. Current sensor 110 may measure the current within a device in comparison to a threshold current. Current sensor 110 may supply a signal to a controller 130 if the current exceeds a threshold current. In an embodiment, current sensor 110 may include a voltage reference and comparator which measures a voltage across a known resistance to effectively measure current. It is contemplated that other types of current sensors may also be utilized by those with ordinary skill in the art.

Voltage sensor 120 may measure a voltage at an output of a device. The voltage at the output of a device may be supplied to a load 160 when device is a power supply or power converter. If the voltage sensor 120 measures a voltage that exceeds a threshold voltage, voltage sensor 120 may supply a signal to controller 130. In an embodiment, voltage sensor 120 may include a voltage reference and comparator which compares the output voltage with the reference voltage.

When controller 130 receives a control signal from either one of current sensor 110 or voltage sensor 120, controller 130 may send a signal to switch 140. Controller 130 may be a logic device, flip-flop, processor and the like. When switch 140 receives a signal from controller 130, switch may interrupt current to protect a device and a load from a large current or large voltage. It is contemplated that switch may create an open circuit, interrupting current to prevent damage to the device and prevent damage to the load 160. It is contemplated that switch 140 may be a transistor, such as a metal oxide semiconductor field effect transistor (MOSFET).

Figure 2:
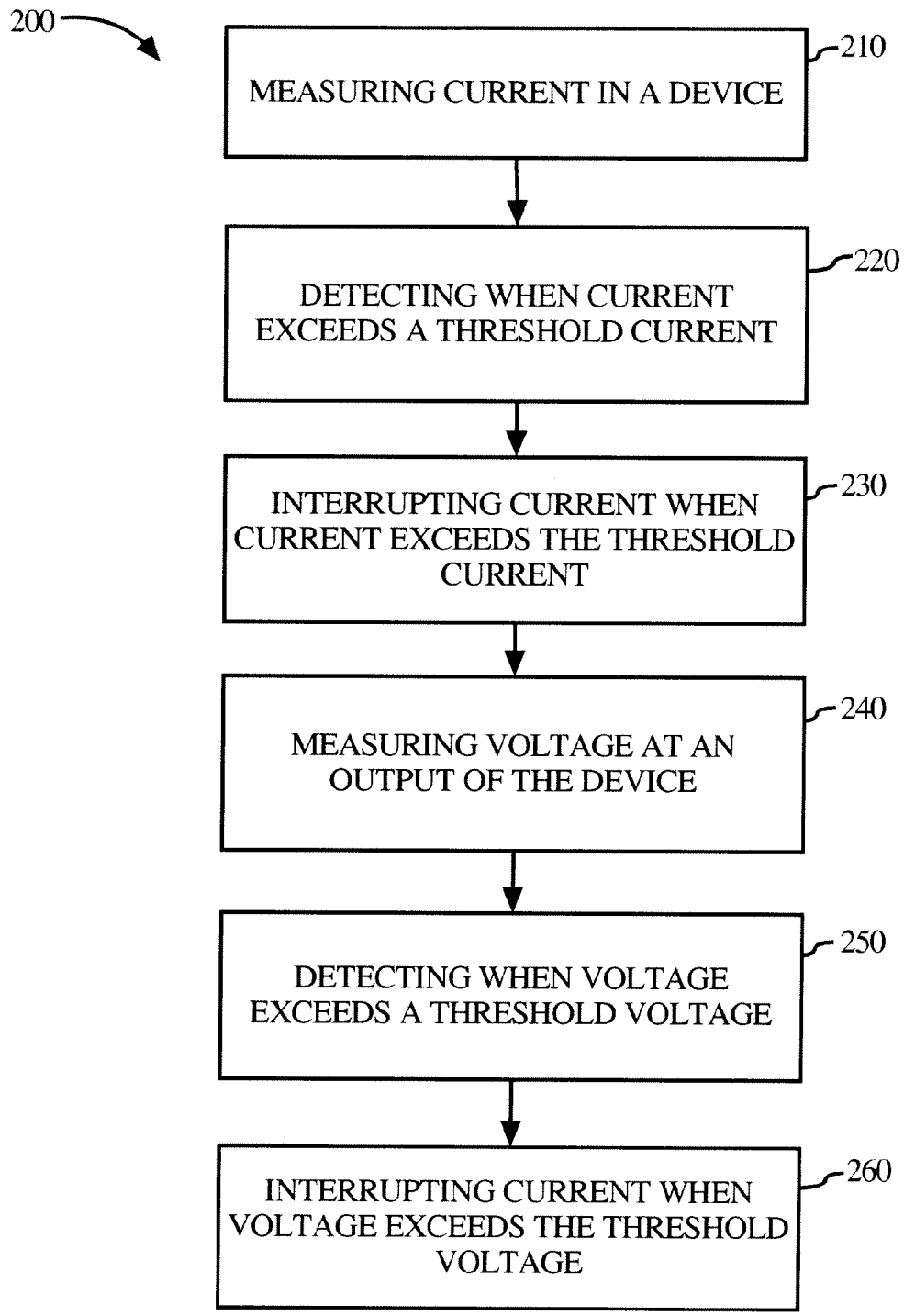
FIG. 2 depicts a flow diagram of a method for protecting a device and a load coupled to the device.

Referring to FIG. 2, a flow diagram of a method 200 for protecting a device and a load coupled to the device is shown. In an embodiment, fuse apparatus 100 of FIG. 1 may execute method 200 for protecting a device and a load coupled to the device. Method 200 may be employed within a computing system of a data storage system for protecting the computing system from a high current or high voltage condition.

Method 200 for protecting a device may include measuring current in a device 210. Method 200 may include detecting when current exceeds a threshold current 220. It is contemplated that current may be measured from a current sensor 110 of FIG. 1 and may be compared with a threshold current. When a current exceeds the threshold current, a signal may be sent from the current sensor to a controller 130 of FIG. 1. Method 200 may include interrupting current when current exceeds the threshold current 230. For example, controller may receive a signal from the current sensor 110 when the current exceeds a threshold current. Controller 130 may cause switch 140 to open which may interrupt current flow within a device and protect the device against a high current.

Additionally, method 200 may include measuring voltage at an output, or load 240. Method 200 may include detecting when a voltage exceeds a threshold voltage 250. It is contemplated that voltage may be measured from a voltage sensor 120 of FIG. 1 and may be compared with a threshold voltage. When the output voltage exceeds the threshold voltage, a signal may be sent from the voltage sensor 120 to controller 130 of FIG. 1. Method 200 may include interrupting current when voltage at the output of a device exceeds the threshold voltage 260. For example, controller 130 may receive a signal from the voltage sensor 120 when the voltage exceeds a threshold voltage. Controller 130 may cause switch 140 to open which may interrupt current flow within a device and protect a load coupled to the output of a device against a high voltage.

Figure 3:
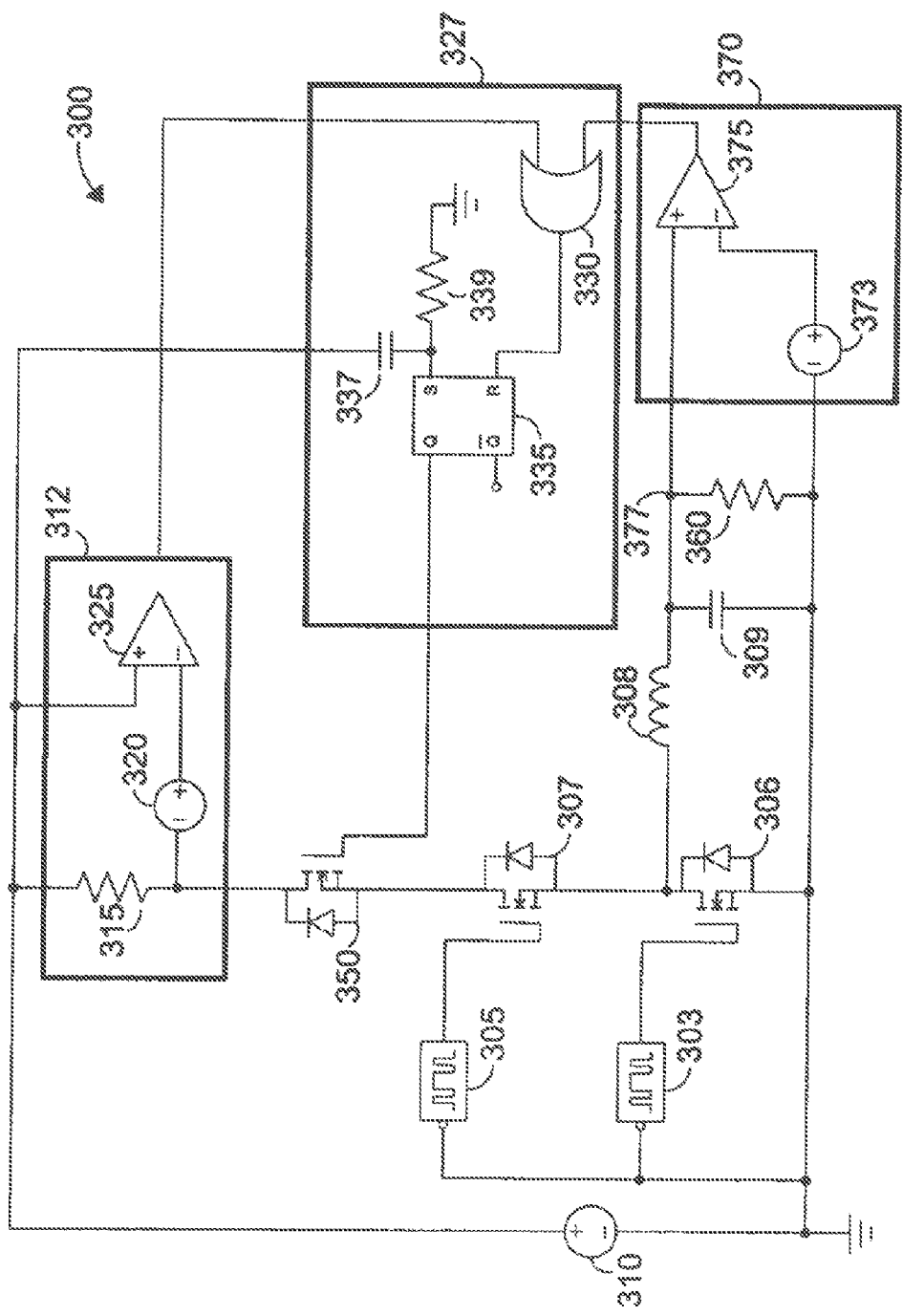
FIG. 3 is a circuit diagram illustrating a converter including a fuse apparatus.

Referring to FIG. 3, a circuit diagram illustrating a converter 300 including a fuse apparatus is shown. In an embodiment, converter 300 may execute method 200 for protecting a device. Additionally, converter 300 may be an exemplary application of fuse apparatus 100 of FIG. 1.

Converter 300 may include an input voltage source 310. Converter 300 may include a first drive 303 coupled to transistor 306 and second drive 305 coupled to transistor 307. Converter 300 may include inductor 307 and capacitor 309. While converter 300 is shown as a buck converter, any type of converter may be employed with the fuse apparatus.

Current sensor 312 may be coupled to the input voltage source 310. Current sensor 312 may include a sense resistor 315, a voltage reference 320 and a comparator 325. Sense resistor 315 and voltage reference 320 may be selected to derive a desired current threshold whereby comparator 325 may supply a signal to OR gate 330 when a current level is greater than the current threshold. A current threshold may be set at a level less than a maximum allowable current operable within the converter 300.

Controller 327 may be coupled to current sensor 312. Controller 327 may include OR gate 330 and flip-flop 335. Flip-flop 335 may be a set-reset flip-flop. Set-reset flip-flop may include a set input, a reset input and an output, such as a q output. However, other types of flip-flops may also be employed by those with ordinary skill in the art. An output of OR gate 330 may be coupled to the reset input of flip-flop 335. OR gate 330 may reset the flip-flop 335. Capacitor 337 and resistor 339 may form a voltage differentiator which may provide a set pulse to the set input of flip-flop 335 at the source of the input voltage source 310 to turn flip-flop 335 on and transistor 350 on when input voltage 310 is operating. The q output of flip-flop 335 may be coupled to a gate of transistor 350. The differentiator may provide a short narrow pulse which "sets" the flip-flop on, which turns transistor 350 on when input voltage is operating. During a high current condition or high output voltage condition, q output of flip-flop 335 may be low which shuts off transistor 350. While transistor 350 may be a MOSFET, it is contemplated that other types of transistors may be employed. It is contemplated that controller 327 may be implemented with other types of circuitry by those with ordinary skill in the art.

Transistor 350 may be an embodiment of a switch 140 of FIG. 1. Transistor 350 may be on and may allow current to pass when input voltage 310 is operating. Then, In the instance of a short circuit whereby a large current may be produced, a signal from current sensor 312 may be produced. Controller 327 may receive the signal and produce a signal to shut transistor 350 off. It is contemplated that transistor 350 may be a switch which when shut off, causes an open circuit to interrupt current to protect the converter 300 and load 360 coupled to an output of the converter 300. Additionally, controller 327 may send a signal to transistor 350 to turn the transistor off when a signal is received from a voltage sensor 370. For example, a signal from the controller may be coupled to the gate input of a MOSFET. When the signal is high, (a high voltage), transistor 350 may be on and may allow current to pass. When the signal is low, (a low voltage), the transistor is off and interrupts current flow. It is contemplated that controller 327 may operate to operate similarly to conventional fuse links whereby the timing of the open circuit is adjustable.

Voltage sensor 370 may include a voltage reference 373 and comparator 375. Comparator 375 may compare an output voltage from the converter 300 at an output terminal 377 from converter 300 with a voltage reference 373. If the output voltage from an output terminal 377 is greater than the voltage reference 373, then comparator 375 may send a signal to OR gate 330 of controller 327. OR gate 330 may send a signal to flip-flop 335 which causes transistor 350 to be off. Thus, current may be interrupted due to the open circuit created by transistor 350 to protect the converter 300 and load 360, such as a processor. It is contemplated that voltage reference 373 may be set at a level less than the maximum allowable voltage of the load 360. For example, voltage reference 373 may be set at 80-90% of the maximum allowable voltage of the load.

It is contemplated that comparators 325, 375 may be operational amplifiers or other types of amplifiers. Additionally, comparators 325, 375 may be equipped with independent voltage supplies, resistor-capacitor filtering, and the like to provide more precise voltage monitoring. Additionally, it should be understood that other types of transistors may be employed in lieu of a MOSFET to achieve similar functionality. For example, a bipolar junction transistor may be employed to operate similarly as the MOSFET.

In an exemplary embodiment, converter 300 may operate to quickly rectify a short circuit condition. For example, transistor 307 coupled with second drive 305 enters a short circuit condition. An increase of current is detected across sense resistor 315 and exceeds a current threshold. Comparator 325 detects when current exceeds a current threshold and sends a signal to OR gate 330. Or gate provides a signal to flip-flop 335 which causes transistor 350 to be off. This may create an open circuit and interrupt current to protect the converter 300.

Figure 4:
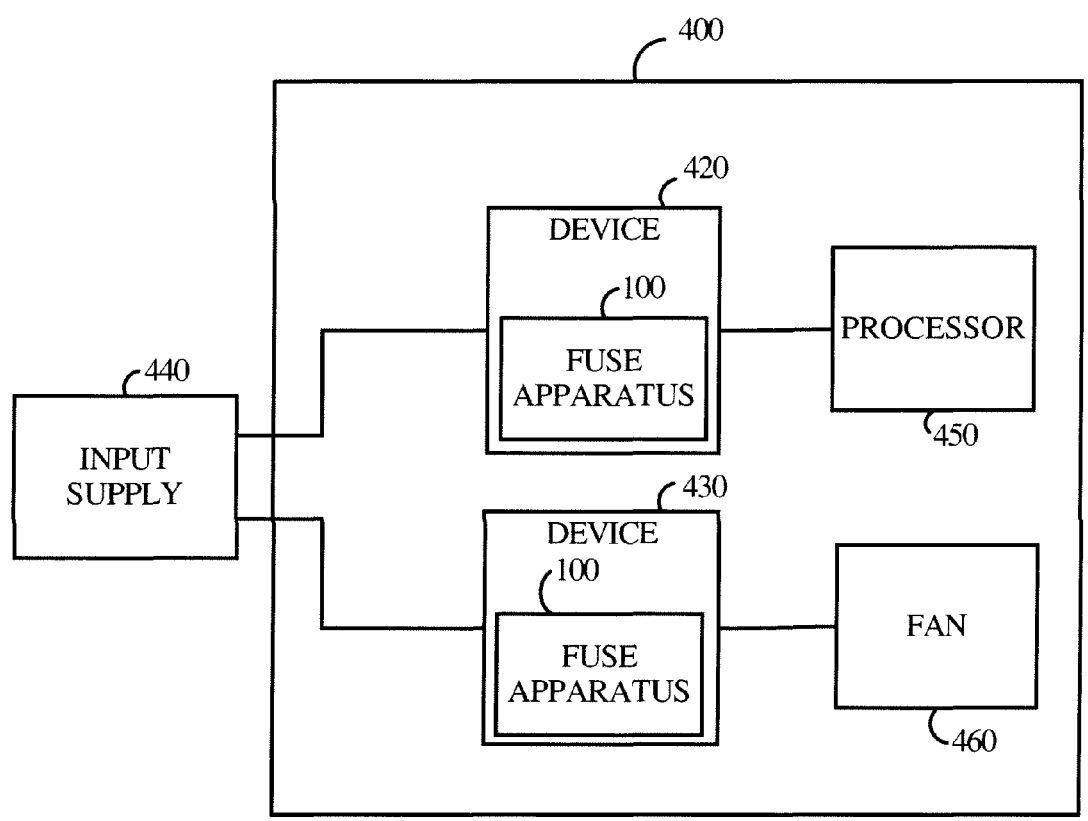
FIG. 4 is a block diagram of an information handling system employing a fuse apparatus.

Referring to FIG. 4, a block diagram of an information handling system 400 employing a fuse apparatus is shown. Information handling system 400 may include multiple devices 420, 430. Devices 420, 430 may be coupled to an input supply 440. Device 420 may be supply an output voltage to a processor 450. Device may supply a low voltage, such as 1.1 volts, to processor 450. Device 420 may be converter, such as a voltage regulator module. Device 430 may supply an output voltage to a fan 460. Device 430 may be a converter. Each device 420, 430 may include a fuse apparatus 100 for protecting devices 420, 430 against a high current and may protect loads, such as processor 450 and fan 460 against a high voltage. It is contemplated that information handling system 400 may be employed as a computing system as part of a data storage system whereby a plurality of storage devices may be coupled to the computing system.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A fuse apparatus, comprising:
a current sensor, said current sensor measuring current within a device;
a controller, said controller includes a voltage differentiator, an OR gate and a flip-flop, an output of said OR gate being coupled to a reset of said flip-flop, the voltage differentiator coupled to an input voltage of said device and provides a set pulse to a set input of said flip-flop, an output of said current sensor is coupled to a first input of said OR gate of said controller;
a switch, said switch being coupled to said controller; and
a voltage sensor, said voltage sensor measuring voltage at an output of said device, an output of said voltage sensor being coupled to a second input of said OR gate of said controller, wherein said current sensor is coupled to conversion circuitry via the switch, the switch being external to the conversion circuitry and being directly controlled by an output of the flip-flop, and wherein said controller causes said switch to interrupt current within said device through an open circuit between terminals of said switch to protect the conversion circuitry and a load coupled to an output of the conversion circuitry when at least one of said current sensor measures current that exceeds a threshold current or said voltage sensor measures voltage that exceeds a threshold voltage.

2. The fuse apparatus of claim 1, wherein said current sensor comprises:
a sense resistor;
a voltage reference; and
a comparator, wherein said comparator compares a voltage across said sense resistor with said voltage reference, an output of said comparator coupled to said first input of said OR gate.

3. The fuse apparatus as claimed in claim 1, wherein said flip-flop is a set-reset flip-flop.

4. The fuse apparatus as claimed in claim 3, wherein an output of said set-reset flip-flop is low when at least one of said current sensor measures current that exceeds a threshold current or said voltage sensor measures voltage that exceeds a threshold voltage.

5. The fuse apparatus as claimed in claim 1, wherein said voltage sensor comprises:
a voltage reference; and
a comparator, wherein said comparator detects when said voltage at said output of said device is greater than a voltage of said voltage reference, an output of said comparator coupled to said second input of said OR gate.

6. The fuse apparatus as claimed in claim 1, wherein said switch is a transistor.

7. A converter comprising:
an input for receiving an input voltage;
conversion circuitry for generating an output voltage, said output voltage being a different voltage than said input voltage; and
a fuse apparatus, comprising:
a current sensor, said current sensor measuring current within said converter;
a controller, said controller includes a voltage differentiator, an OR gate and a flip-flop, an output of said OR gate being coupled to a reset of said flip-flop, the voltage differentiator coupled to said input voltage and provides a set pulse to a set input of said flip-flop, an output of said current sensor is coupled to a first input of said OR gate of said controller;
a switch separate from the conversion circuitry being directly controlled by an output of the flip-flop, said switch being included between the conversion circuitry and the current sensor and coupled to said controller; and
a voltage sensor, said voltage sensor measuring voltage at said output of the converter, an output of said voltage sensor being coupled to a second input of said OR gate of said controller, wherein said controller causes said switch to interrupt current within said converter through an open circuit between terminals of said switch to protect the conversion circuitry and a load coupled to an output of the conversion circuitry when at least one of said current sensor measures current that exceeds a threshold current or said voltage sensor measures voltage that exceeds a threshold voltage.

8. The converter as claimed in claim 7, wherein said current sensor comprises:
a sense resistor;

a voltage reference; and a comparator, wherein said comparator compares a voltage across said sense resistor with said voltage reference, an output of said comparator coupled to said first input of said OR gate.

9. The converter as claimed in claim 7, wherein said flip-flop is a set-reset flip-flop.

10. The converter as claimed in claim 9, wherein an output of said set-reset flip-flop is low when at least one of said current sensor measures current that exceeds a threshold current or said voltage sensor measures voltage that exceeds a threshold voltage.

11. The converter as claimed in claim 7, wherein said voltage sensor comprises:

a voltage reference; and a comparator, wherein said comparator detects when said voltage at said output is greater than a voltage of said voltage reference, an output of said comparator coupled to said second input of said OR gate.

12. The converter as claimed in claim 7, wherein said switch is a transistor.

* * * * *